(12) United States Patent  
Matthias et al.

(10) Patent No.: US 6,481,511 B2
(45) Date of Patent: Nov. 19, 2002

(54) ROTARY DRILL BIT

(75) Inventors: Terry R. Matthias, Upton St. Leonards (GB); Nigel Dennis Griffin, Nympsfield (GB); Peter Raymond Hughes, Stroud (GB)

(73) Assignee: Camco International (U.K.) Limited (GB)

( * ) Notice: Subject to any disclaimer, the term of this patent is extended or adjusted under 35 U.S.C. 154(b) by 0 days.

(21) Appl. No.: 09/682,471

(22) Filed: Sep. 6, 2001

(65) Prior Publication Data

US 2002/0033282 A1 Mar. 21, 2002

Related U.S. Application Data

(60) Provisional application No. 60/281,054, filed on Apr. 2, 2001, and provisional application No. 60/234,075, filed on Sep. 20, 2000.

(51) Int. Cl.[7] .............................................. E21B 10/46
(52) U.S. Cl. ........................................ 175/431; 175/433
(58) Field of Search ................................. 175/431, 433

(56) References Cited

U.S. PATENT DOCUMENTS

| | | | | |
|---|---|---|---|---|
| 4,471,845 A | * | 9/1984 | Jurgens | 175/431 |
| 5,531,281 A | * | 7/1996 | Murdock | 175/431 |
| 5,607,024 A | | 3/1997 | Keith et al. | |
| 5,833,021 A | | 11/1998 | Mensa-Wilmot | |
| 5,979,571 A | * | 11/1999 | Scott et al. | 166/298 |
| 6,021,859 A | | 2/2000 | Tibbitts et al. | |
| 6,123,161 A | * | 9/2000 | Taylor | 175/397 |

FOREIGN PATENT DOCUMENTS

| | | |
|---|---|---|
| EP | 0 462 955 B1 | 6/1991 |
| EP | 0 554 568 A3 | 8/1993 |
| EP | 0 462 091 B1 | 3/1996 |
| EP | 0 546 725 A | 9/1996 |
| GB | 2 161 849 A | 1/1986 |
| GB | 2 261 894 A | 6/1993 |
| GB | 2 285 823 A | 7/1995 |
| GB | 2 292 163 A | 2/1996 |
| GB | 2 294 712 A | 5/1996 |
| GB | 2 298 668 A | 9/1996 |
| GB | 2 300 208 A | 10/1996 |
| GB | 2 317 195 A | 3/1998 |
| JP | 59219500 A | 12/1984 |
| WO | WO 00/28106 A1 | 5/2000 |

OTHER PUBLICATIONS

European Search Report, EP 01 30 7636, Feb. 18, 2002, "Documents Considered to be Relevant".

Translation of Japanese Unexamined Patent Application No. S59–219500, "Diamond Sintering and Processing Method," Shuji Yatsu and Tetsuo Nakai, inventors; Publication Date Dec. 10, 1984; Applicant Sumitomo Electric Industries.

* cited by examiner

*Primary Examiner*—Hoang Dang
(74) *Attorney, Agent, or Firm*—Jeffery E. Daly

(57) ABSTRACT

A rotary drill bit includes cutters arranged in a series of concentric rings, the cutters of one of the rings having a different wear resistance to the cutters of another of the rings with the result that the stability of the drill bit improves with wear. Although the wear resistance is different, the cutters have substantially the same impact toughness.

14 Claims, 3 Drawing Sheets

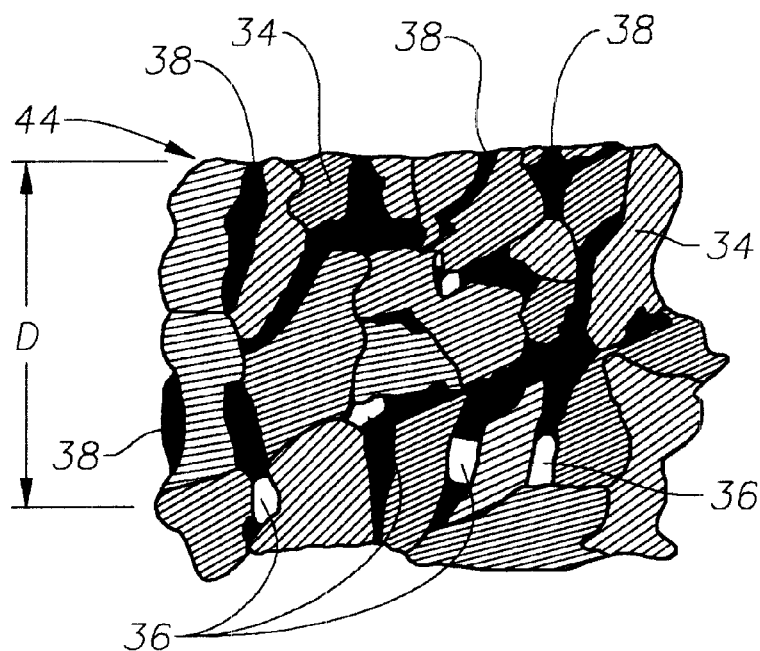
Fig. 5
Fig. 6
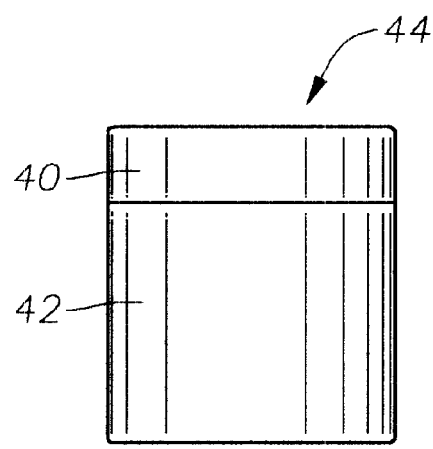

ROTARY DRILL BIT

CROSS REFERENCE TO RELATED APPLICATIONS

This application claims priority from U.S. Provisional Patent Application No. 60/234,075 filed Sep. 20, 2000, and from U.S. Provisional Patent Application No. 60/281,054 filed Apr. 2, 2001.

BACKGROUND OF INVENTION

1. Field of the Invention

This invention relates to a rotary drill bit for use in the formation of wellbores. In particular, the invention relates to a rotary drag-type drill bit of improved stability, particularly when worn. A drill bit of this type typically comprises a bit body having a shank for connection to a drill string, a plurality of blades formed on the bit body extending outwardly from a central axis of rotation of the bit, and a plurality of cutting elements mounted along each blade.

2. Description of the Prior Art

The bit body may be machined from solid metal, or may alternatively be molded using a powder metallurgy process in which a tungsten carbide powder is infiltrated with a metal alloy binder in a furnace so as to form a hard matrix.

Typically, the cutters each take the form of a tablet of superhard material bonded to a substrate, for example of tungsten carbide. Each cutter is typically of circular or part-circular shape.

In some drill bits, the cutters are arranged upon the blades at different radial distances to one another so that the cutters sweep over the full area of the bottom of the wellbore. However, there is a tendency for drill bits of this type to be of relatively low stability.

In order to improve the stability, it is known to arrange the cutters in a series of concentric rings at different cutting heights. As a result, the drill bit tends to form, in the bottom of the wellbore, a series of corrugations or rings. The co-operation between the drill bit and the pattern formed in the bottom of the wellbore tends to resist lateral movement of the bit, resulting in the drill bit being of improved stability. In the past, drill bit designs were compromised because cutters having high abrasion resistance had low impact toughness and cutters having high impact toughness had low abrasion resistance. As a result of this trade-off such placement of the cutters may improve the abrasion resistance of the drill bit, but it is likely that the overall drilling efficiency is not optimized due to relatively poor impact toughness.

Drill bits of this type are known as tracking drill bits and are described in, for example, GB 2294712 and GB 2292163.

SUMMARY OF INVENTION

It is an object of the invention to provide a drill bit of good stability, particularly when the drill bit becomes worn.

According to the present invention there is provided a rotary drill bit comprising a bit body having an axis of rotation, a plurality of cutters mounted upon the bit body in a plurality of concentric rings centered upon the axis of rotation, wherein said plurality of cutters comprises a first type of cutter of relatively low abrasion resistance and a second type of cutter of relatively high abrasion resistance, at least one of said concentric rings consisting of cutters of the first type, at least another of said concentric rings including at least one cutter of said second type. The impact toughness of all the cutters is substantially the same.

It will be appreciated, in use, that the cutters of the first type will wear at a higher rate than those of the second type with the result that a drill bit which initially has a reasonably uniform cutting profile will, when worn, form grooves in the formation being drilled. As a result, the stability of the drill bit improves with wear.

Preferably, the cutters of the second type each include a polycrystalline diamond table treated so as to render a region thereof close to a cutting edge thereof substantially free of a material having a catalyzing effect. Cutters of this type have been found to have an improved wear and abrasion resistance when compared with cutters not so treated and yet have substantially the same impact toughness as the first type of cutters.

According to another aspect of the invention there is provided a rotary drill bit comprising a bit body having a leading face and an axis of rotation, the leading face having a plurality of angularly spaced blades, each said blade carrying a plurality of cutters, wherein said plurality of cutters includes a first type of cutter having a relatively low abrasion resistance and a second type of cutter having a relatively high abrasion resistance, and wherein at least one of said blades carries at least one cutter of the first type and at least one cutter of the second type. The impact toughness of all the cutters is substantially the same.

Preferably, the cutters on each blade of the first type are arranged alternately with cutters from the second type.

BRIEF DESCRIPTION OF DRAWINGS

The invention will further be described, by way of example, with reference to the accompanying drawings.

FIG. 5 is a diagrammatic view illustrating the structure of part of one of the cutters.

FIG. 6 is a diagrammatic view of one of the cutters.

DETAILED DESCRIPTION

Figure 1:
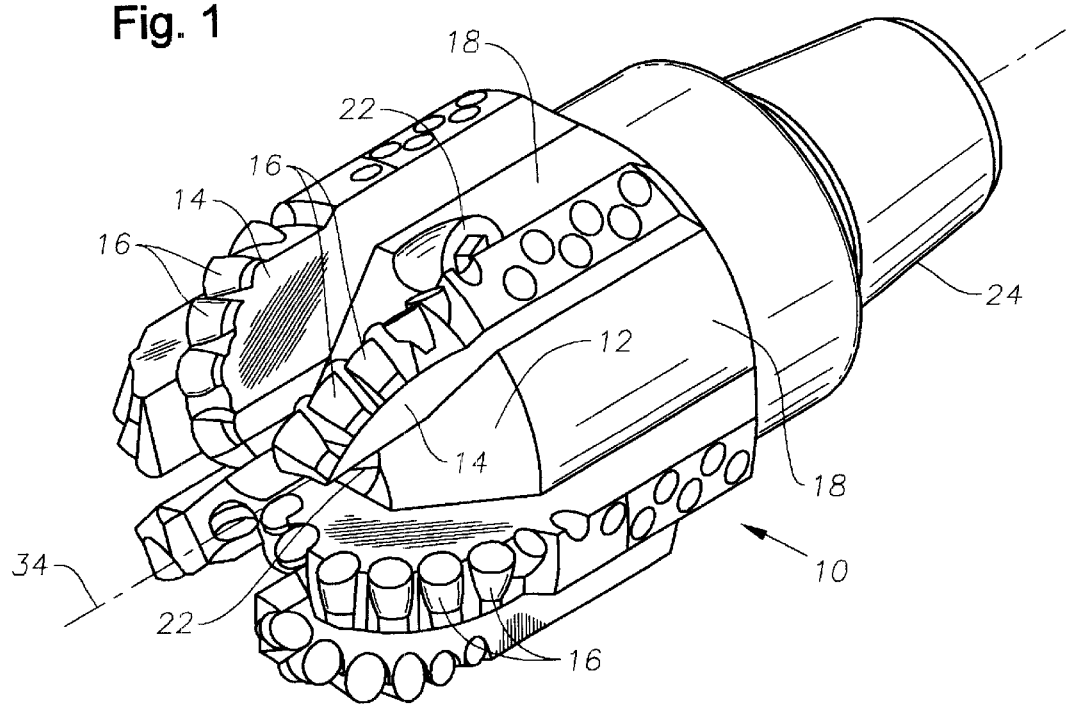
FIG. 1 is a perspective view of a drill bit.

The accompanying drawings illustrate a rotary drill bit of the rotary drag-type comprising a bit body 10 of machined steel form. The bit body 10 has a leading face 12 provided with a plurality of upstanding, radially spaced blades 14. Each blade 14 carries a plurality of cutters 16. Between each pair of adjacent blades 14 is defined a channel 18 which is supplied, in use, with drilling fluid through a series of passages 20 provided internally of the drill bit body 10, each passage 20 terminating at a nozzle 22. The supply of drilling fluid serves to clean and cool the cutters 16, in use.

The bit body 10 is shaped to include a shan 4 to permit the drill bit to be connected to the remainder of a drill string and to permit the bit to be driven to rotate about an axis of rotation 34 thereof.

Figure 2:
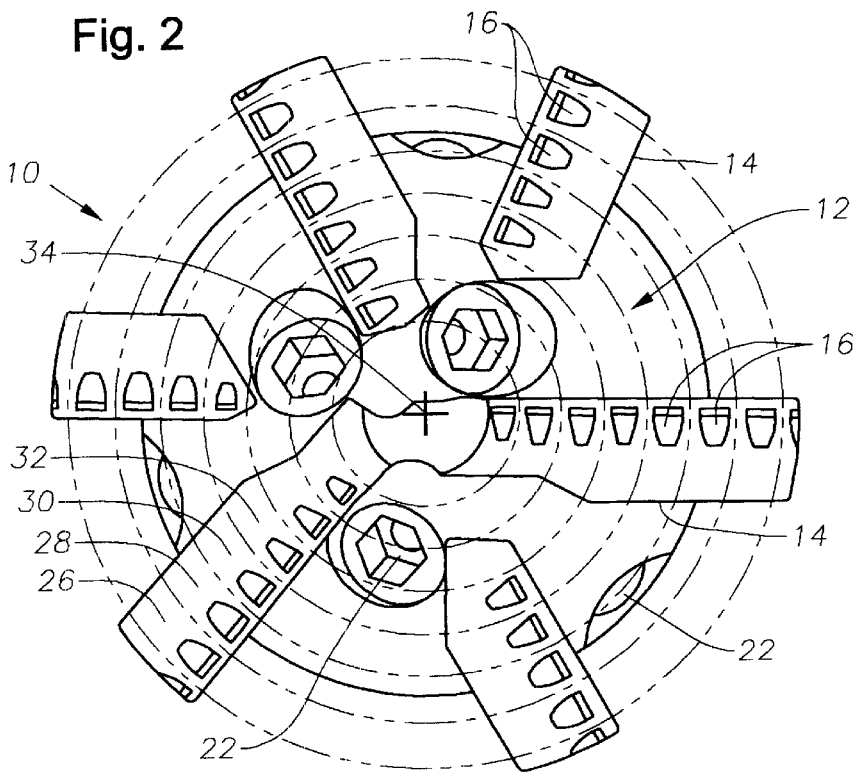
FIG. 2 is a diagrammatic view of an end of the drill bit of FIG. 1.

As illustrated in FIG. 2, the cutters 16 are arranged on the blades 14 in a series of concentric rings 26, 28, 30, 32. The concentric rings 26, 28, 30, 32 are centered upon the axis of rotation 34 of the bit body 10.

The drill bit includes cutters 16 of two different types. A first type of cutters 16a provided on the drill bit have a relatively low abrasion resistance, a second type of cutters 16b provided on the drill bit having a higher abrasion resistance. The cutters 16 are arranged such that the first ring 26 of cutters is made up exclusively of cutters 16a of the first type, the second ring 28 is made up exclusively of cutters 16b of the second type, the third ring 30 is made up exclusively of cutters 16a of the first type, and the fourth ring 32 is made up exclusively of cutters 16b of the second type. It will be appreciated, therefore, that the cutters 16 mounted upon each blade 14 are arranged such that cutters 16a of the first type alternate with cutters 16b of the second type.

Figure 3:
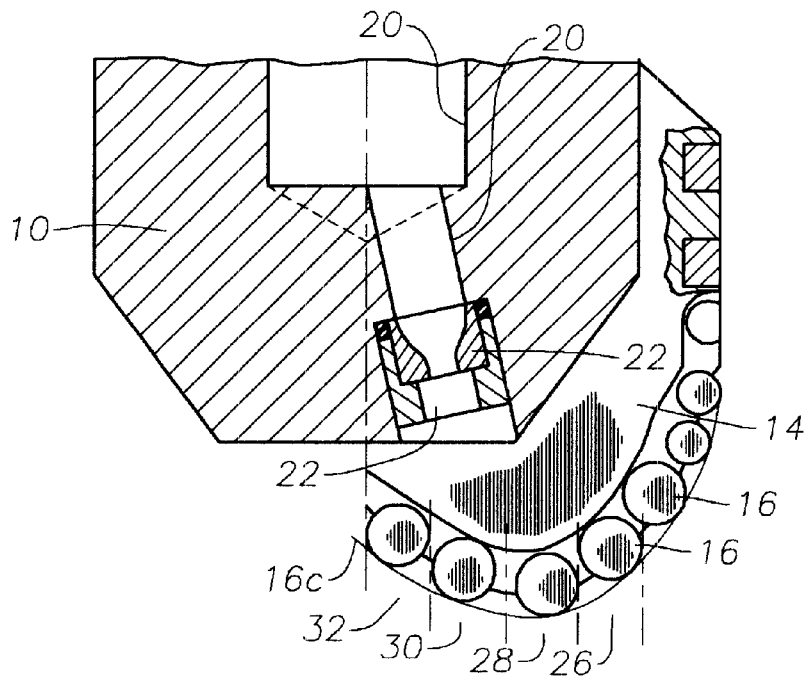
FIG. 3 is a view of one of the blades of the drill bit of FIG. 1, before use.
Figure 4:
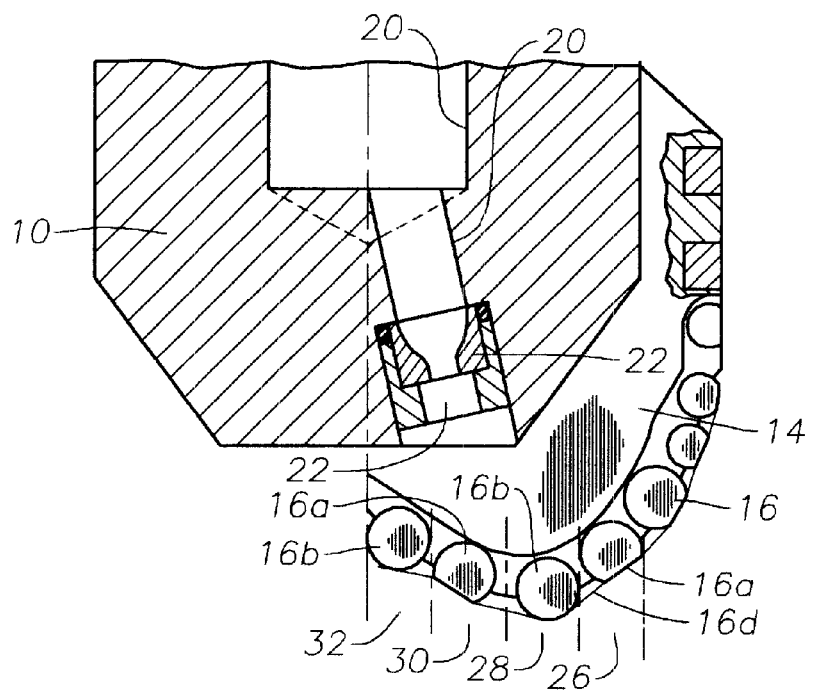
FIG. 4 is a view similar to FIG. 3 illustrating the bit when worn.

FIG. 3 illustrates, diagrammatically, the drill bit of FIGS. 1 and 2 prior to use. It will be noted from FIG. 3 that all of the cutters 16 are of circular shape. FIG. 4 is a view similar to FIG. 3 illustrating the drill bit after use. It will be noted from FIG. 4 that the use of the drill bit has resulted in wear occurring to the cutters 16. It will further be noted from FIG. 4 that the cutters 16a of the first type have worn to a greater extent than the cutters 16b of the second type. As a result, the cutting profile of the drill bit has changed from being of relatively uniform shape as shown by the line 16c in FIG. 3 at the commencement of use to being shaped to form a series of concentric ridges in the formation being drilled as shown by the line 16d in FIG. 4. It will be appreciated that the co-operation between the drill bit and the pattern of concentric ridges and grooves formed in the wellbore, in use, results in the worn drill bit being of relatively good stability. The good stability arises as a result of the resistance to lateral movement of the drill bit resulting from co-operation between the drill bit and the grooved formation.

Although the cutters 16 could potentially take a range of different forms, in one particularly advantageous form, each cutter 16 comprises a table 40 of polycrystalline diamond bonded to a tungsten carbide substrate 42, as shown in FIG. 6. It has been found that the abrasion resistance of a cutter of this type can be increased by leaching or otherwise removing from the part of the cutter 16 adjacent a working surface 44 thereof the catalyzing materials used in the formation of the cutter. Thus, in one embodiment, the cutters 16a may be of the form in which the catalyzing material has not been leached from the polycrystalline diamond, the cutters 16b being of the type in which such leaching has occurred. FIG. 5 illustrates, diagrammatically, the structure of a part of one of the cutters 16b. In FIG. 5, a matrix of interstices is shown between the crystals 34 of the polycrystalline diamond table. During the formation of the polycrystalline diamond table, the interstices house a catalyzing material 36, for example in the form of cobalt. As mentioned above, it has been found that by removing the catalyzing material from the interstices, the abrasion resistance of the polycrystalline diamond table can be increased. In FIG. 5, the cobalt material 36 has been leached from the polycrystalline diamond table to a depth D, thus leaving the interstices 38 close to the working surface 44 of the polycrystalline diamond table 40 substantially free of catalyzing material.

Although in the description hereinbefore, the interstices 38 close to the working surface 44 are described as being rendered substantially free of catalyzing material by leaching the catalyzing material from the polycrystalline diamond. The improvement in the abrasion resistance of the material may alternatively be achieved by converting the catalyzing material to a form in which it does not have a catalyzing effect or by reacting the catalyzing material with another material to form a substance which does not have a catalyzing effect. Further, if desired, only a proportion of the catalyzing material may be removed from the interstices 38 close to the working surface 44.

Although the cutters 16a, 16b described hereinbefore comprise a first set in which the catalyzing material is present close to the working surface 44 of the cutter 16 and a second set in which the catalyzing material is removed, it will be appreciated that one or other of these sets of cutters could take the form of cutters in which only a proportion of the catalyzing material has been removed from the part of the cutter adjacent the working surface thereof. In the hereinbefore described manufacturing process for improving wear resistance, as the wear resistance of a cutter improves, its ability to withstand impact is substantially retained. Therefore, although the cutters may be made with varying wear resistance, the impact toughness for the cutters is substantially the same, unlike cutters of the prior art. Further, if desired, the drill bit could include, in addition to rings of relatively low and relatively high abrasion resistance cutters, rings of cutters of an intermediate abrasion resistance.

Although in the arrangement described hereinbefore, at least some of the rings are formed exclusively of cutters of the second type, it will be appreciated that, if desired, one or more of the rings of cutters could be made up of a mixture of cutters of the first and second types.

Further variations are possible, for example, the first type of cutter and the second type of cutter may differ from one another in that the cutters of the second type are treated to remove catalyzing material to a greater depth than those of the first type. Such treatment will result in the wear and abrasion characteristics of the two types of cutter differing from one another with the result that the cutting profile of the worn bit will be grooved. A similar effect may be achieved using cutters of differing abrasion resistance and differing size.

The provision of a drill bit which becomes more stable with wear is beneficial as the tendency for a bit to deviate from a desired path is relatively low when bits are new, the tendency to deviate increasing with wear.

Although the description hereinbefore is of specific arrangements, it will be appreciated that various alterations and modifications may be made thereto within the scope of the attached claims. Also, whereas the present invention has been described in particular relation to the drawings attached hereto, it should be understood that other and further modifications apart from those shown or suggested herein, may be made within the scope and spirit of the present invention.

What is claimed is:

1. A rotary drill bit comprising a bit body having an axis of rotation, and a plurality of cutters arranged in concentric rings centered on the axis of rotation, the plurality of cutters comprising a first type of cutter of a relatively low abrasion resistance and a second type of cutter of a relatively high abrasion resistance, at least one of the rings consisting of cutters of the first type, at least another of the rings including at least one cutter of the second type, wherein the first type of cutter has substantially the same impact toughness as the second type of cutter, and wherein each cutter of the second type comprises a table of polycrystalline diamond which defines a matrix of interstices containing a catalyzing material, and wherein the interstices close to a working surface of the table contain less catalyzing material than the interstices spaced from the working surface.

2. A rotary drill bit according to claim 1, wherein said at least another of the rings consists of cutters of the second type.

3. A rotary drill bit according to claim 1, wherein the bit body is provided with a plurality of blades each carrying a plurality of cutters, the cutters of the fist type and cutters of the second type being arranged in an alternating pattern along each blade.

4. A rotary drill bit according to claim 1, wherein the interstices close to the working surface are substantially free of catalyzing material.

5. A rotary drill bit according to claim 1, wherein each cutter of the first type comprises a table of polycrystalline diamond which defines a matrix of interstices containing a catalyzing material, the interstices within a volume close to a working surface of the table containing more catalyzing material than those of a similar volume of each cutter of the second type.

6. A rotary drill bit comprising a bit body having an axis of rotation, and a plurality of blades angularly spaced around the axis of rotation, a plurality of cutters being mounted upon the blades, the plurality of cutters comprising a plurality of cutters of a first type having a relatively low abrasion resistance and a plurality of cutters of a second type having a relatively high abrasion resistance, at least one of the blades having mounted thereon at least one of the cutters of the first type and at least one of the cutters of the second type, wherein each cutter of the second type comprises a table of polycrystalline diamond which defines a matrix of interstices containing a catalyzing material, and wherein the interstices close to a working surface of the table contain less catalyzing material than the interstices spaced from the working surface, and wherein the first type of cutters has substantially the same impact toughness as the second type of cutters.

7. A rotary drill bit according to claim 6, wherein the cutters of the first type are arranged in an alternating pattern with the cutters of the second type on the said at least one blade.

8. A rotary drill bit according to claim 6, wherein the cutters are arranged in a plurality of concentric rings centered on the axis of rotation.

9. A rotary drill bit according to claim 8, wherein at least one of said rings consists of cutters of the first type, and at least another of said rings includes at least one cutter of the second type.

10. A rotary drill bit comprising a bit body having an axis of rotation, a plurality of cutters being mounted upon the bit body, the plurality of cutters comprising a first type of cutter and a second type of cutter having a higher abrasion resistance than the first type of cutter, said first type of cutter having substantially the same impact toughness as the second type cutter wherein each cutter of the second type comprises a table of polycrystalline diamond which defines a matrix of interstices containing a catalyzing material, and wherein the interstices close to a working surface of the table contain less catalyzing material than the interstices spaced from the working surface.

11. A rotary drill bit according to claim 10, wherein the cutters are arranged in a plurality of concentric rings centered on the axis of rotation.

12. A rotary drill bit according to claim 11, wherein at least one of said rings consists of the first type of cutter, and at least another of said rings includes at least one cutter of the second type.

13. A rotary drill bit according to claim 10, further comprising a plurality of blades angularly spaced around the axis of rotation.

14. A rotary drill bit according to claim 13, wherein the first type of cutter and the second type of cutter are arranged in an alternating pattern along each blade.

\* \* \* \* \*